United States Patent [19]

Baker et al.

[11] 4,182,231
[45] Jan. 8, 1980

[54] FROZEN PATTY FEEDER

[75] Inventors: Edward D. Baker, San Francisco; Nils Lang-Ree, Los Altos; John S. Brown, Half Moon Bay, all of Calif.

[73] Assignee: NPI Corporation, Burlingame, Calif.

[21] Appl. No.: 919,389

[22] Filed: Jun. 26, 1978

[51] Int. Cl.² ............................................. A47J 37/06
[52] U.S. Cl. ..................................... 99/387; 221/261
[58] Field of Search .................. 99/387, 357; 221/124, 221/261, 3

[56] References Cited

U.S. PATENT DOCUMENTS

| | | | |
|---|---|---|---|
| 1,538,864 | 5/1925 | Morrison | 99/387 |
| 1,717,926 | 6/1929 | Horowitz | 99/387 |
| 2,226,626 | 12/1940 | Mann | 221/124 |
| 4,007,853 | 2/1977 | Bahneman | 221/3 |

*Primary Examiner*—Billy J. Wilhite
*Attorney, Agent, or Firm*—Lothro & West

[57] ABSTRACT

A frozen patty feeder for a group of individual patties and especially for use with a broiler having a horizontal conveyor run advancing in a predetermined direction includes a first upstanding wall extending transversely of the direction of conveyor advance with the lower margin of the first wall spaced above the conveyor run an amount only slightly more than the thickness of an individual frozen patty. The feeder also includes a second wall extending transversely of the direction of conveyor advance and disposed between a level about even with that of the conveyor and a somewhat higher level, the second wall being inclined in the direction of conveyor advance when considered from the top of the wall downwardly, the first and second walls being spaced apart far enough in the direction of advance to admit of patties of a predetermined diameter when the patties are superimposed upon each other in a staggered, shingled or offset fashion.

6 Claims, 4 Drawing Figures

FROZEN PATTY FEEDER

BRIEF SUMMARY OF THE INVENTION

In handling large numbers of frozen patties such as hamburger patties in connection with the automatic feeding thereof onto conveyor belts or chains between broiling elements, there is sometimes a problem because the patties are normally kept next to each other in frozen condition and sometimes do not easily separate from each other for individual advancement. The present frozen patty feeder is arranged so that the individual patties originally in a stack and which may be frozen or stuck together are manually separated, and the patties then are so supported, retained and handled in the feeder so that they remain separate and advance individually, each without interference with any of the other frozen patties.

DETAILED DESCRIPTION

Figure 2:
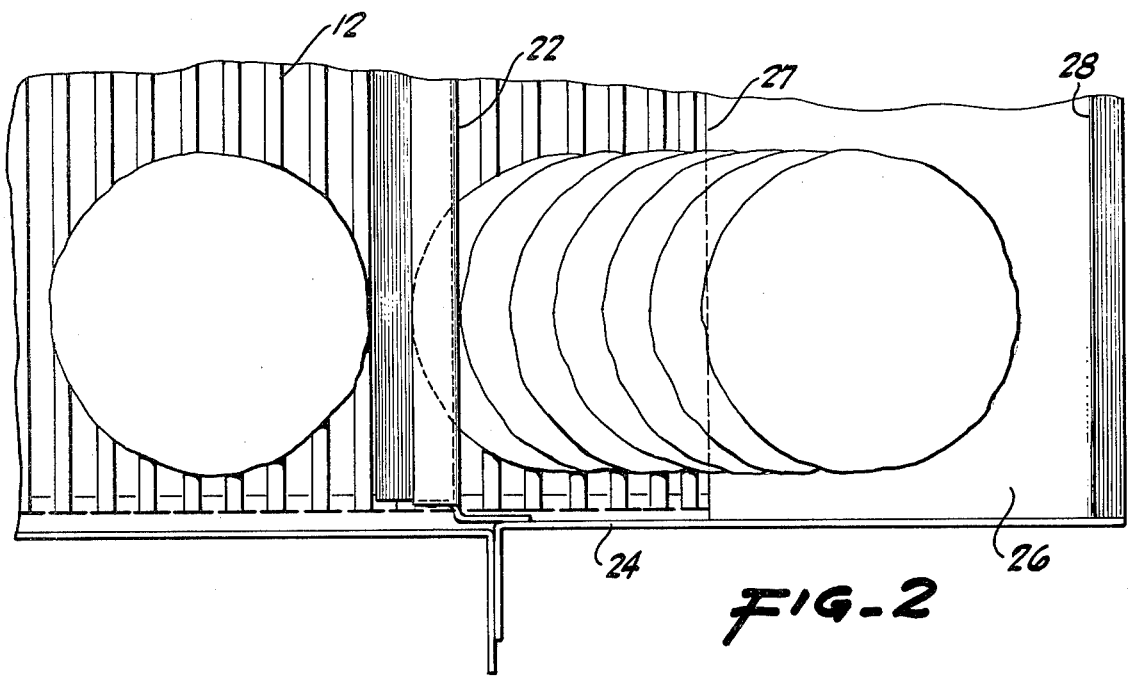
FIG. 2 is a cross-section, the planes of which are indicated by the lines 2—2 of FIG. 1.
Figure 1:
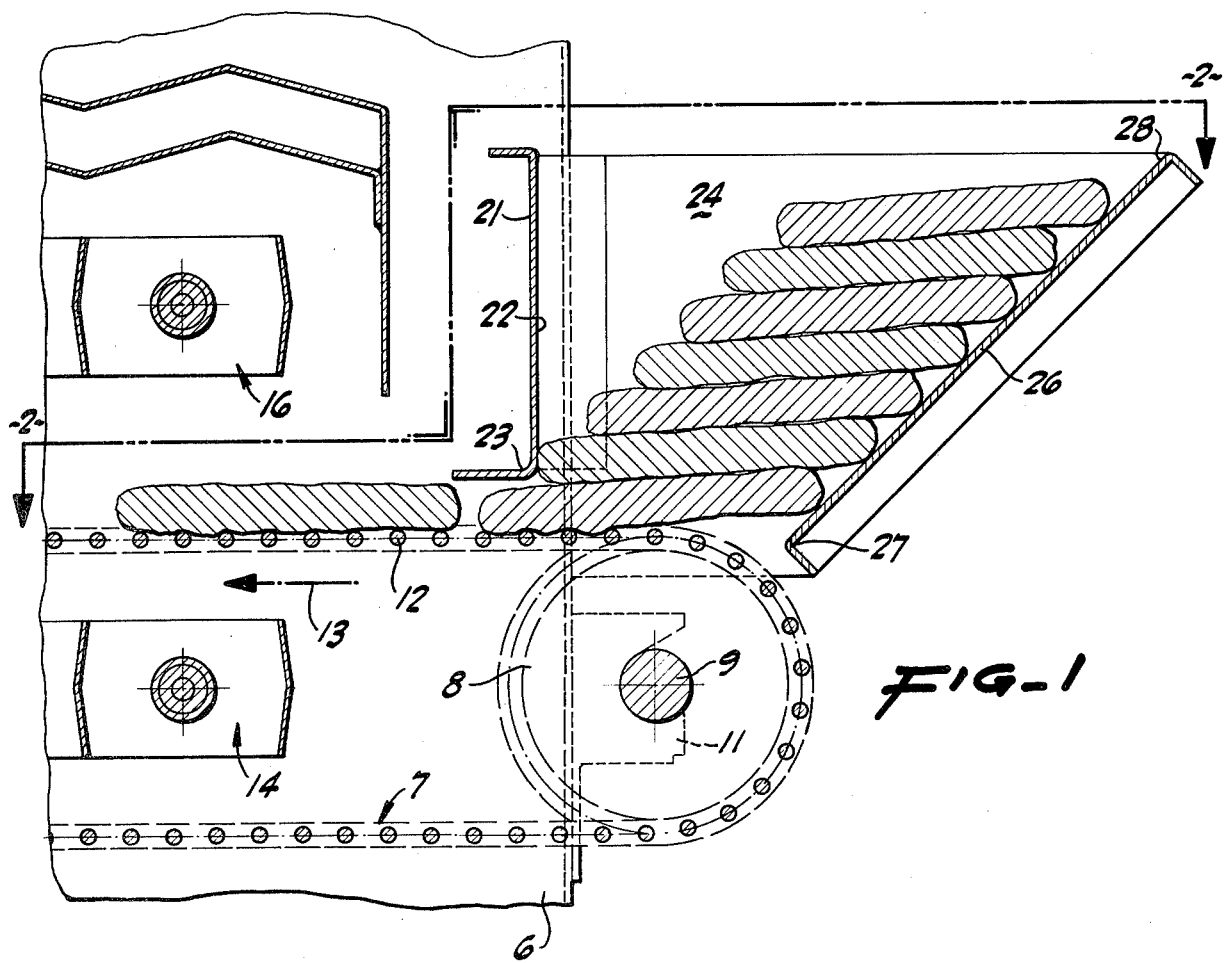
FIG. 1 is a cross-section on a longitudinal, vertical plane through a portion of a frozen patty feeder constructed pursuant to the invention, certain portions being broken away to reduce the size of the figure.

While the frozen patty feeder can be readily adapted to handle patties of different constituencies and of different thicknesses and sizes or diameters, it has with success been embodied in the forms disclosed herein cooperating with meat patties or hamburger patties of substantially the standard thickness and diameter. These patties are normally received for use in stacks or arrays one on top of the other, and because of the freezing may sometimes have sufficient ice crystals so that the individual patties are adhered together and do not readily come apart.

The broiler in which the patties are to be broiled includes any suitable sort of framework 6 on which is disposed a bar or chain conveyor 7 in the shape of an endless belt trained around sprockets 8 carried on the frame 6 by shafts 9 resting in journal blocks 11. The conveyor belt is propelled with its upper run 12 substantially planar and advancing in the direction of the arrow 13, indicating a predetermined direction of advance. The upper run 12 advances between a lower broiler unit 14 and an upper broiler unit 16, so that both sides of patties on the upper run 12 are simultaneously broiled on the top and on the bottom. Although not shown in the drawings, the patties are discharged from the far end of the upper run 12 where the conveyor passes around a similar sprocket arrangement.

As part of the patty feeder, there is provided on the frame 6 a first wall 21 extending transversely of the direction of advance and being disposed substantially with its front or exposed face 22 in a vertical plane or a plane normal to the general plane of the upper run 12. The wall 21 at its lowermost edge 23 is disposed above the upper surface of the upper run 12 a distance that is slightly greater vertically than the standard thickness of an individual patty, so that a patty on the upper run of the conveyor 12 can easily pass through the opening below the lower corner 23 of the first wall, but such opening is small enough so that two patties cannot simultaneously pass therethrough, the wall 21 acting as a barrier against advance of the uppermost patty.

In addition to the first wall 21, there is also mounted on the frame 6, primarily by means of side walls 24, a second wall 26. This is preferably a sheet of relatively smooth or slippery metal such as stainless steel, conveniently polished, and disposed with its lower edge 27 extending transversely and spaced substantially in the plane of the upper run of the conveyor and a short distance behind the upper run 12 of the conveyor. The second wall 26 at its lower portion is also spaced away from the edge 23 of the first wall a longitudinal distance which is about the same as the diameter of a patty. The distance may be somewhat greater than the patty diameter or may be slightly less than the patty diameter, but the walls are arranged so that but one patty at a time can pass downwardly and forwardly between the edge 23 of the first wall 21 and the lower portion of the second wall 26 near the edge 27. The wall 26 at the top edge 28 is about at the level of the top of the wall 21, the second wall 26 then extending downwardly and forwardly, or in the predetermined direction 13 if the wall 26 is considered from the top downwardly. That is, the wall is inclined at approximately a forty-five degree angle so that the space between the walls 21 and 26 converges from the top downwardly.

In the operation of this structure, when the heaters 14 and 16 have been energized and the conveyor upper run is advancing in the direction of the arrow 13, the operator takes a stack of frozen patties as normally received in a vertical pile and breaks them apart so that any adhering or frozen-together portions are disrupted. He then places the patties individually in staggered, or step-wise or shingled fashion upon each other and between the walls 21 and 26 so that the lowermost patty is substantially in contact with the upper run 12 of the advancing conveyor and the trailing edges of all of the patties are substantially in contact with the second or rear wall 26.

In that position, the lowermost patty, being subject to heat from the burners 14 and 16, tends to lose its rigidity and to thaw and so to interengage somewhat with the cross bars of the conveyor. The lower patty by friction and some interengagement then is pulled ahead by the conveyor. As it does so, the patty passes beneath the lower edge 23 of the first wall 21, with the trailing portion of the patty sliding very easily down the wall 26. This is partially because that portion of the patty is usually still frozen, and any ice crystals thereon act as a sort of lubricant against the very slippery upper surface of the wall 26. The lowermost patty then in engagement with the chain 12 or conveyor 12 is pulled forwardly in the direction of the arrow 13 and rides from beneath the next superposed patty partially confined between the first wall 21 and the second wall 26.

As soon as the support of the first patty is withdrawn from beneath the second patty, the forward edge of the second patty tends to drop partially because it has been in contact for a short time with the relatively warm lower edge 23 of the wall 21 and partly because the patty can slide downwardly on the wall 26 without difficulty, especially under the weight of the superposed patties. The second patty then drops onto the conveyor upper run 12 and begins to thaw slightly and interengage with the bar conveyor and so is advanced in the direction of the arrow 13, just as the preceding patty. This process continues until all of the patties have been removed from the patty feeder.

From time to time additional patties can be stacked on top, particularly if they are separated and arranged in a staggered or shingled array, as illustrated. It has been found that in operation even though the patties are relatively cold and have been frozen or even frozen together, once having been broken apart they do not tend to refreeze together in the environment of the present feeder.

Figure 4:
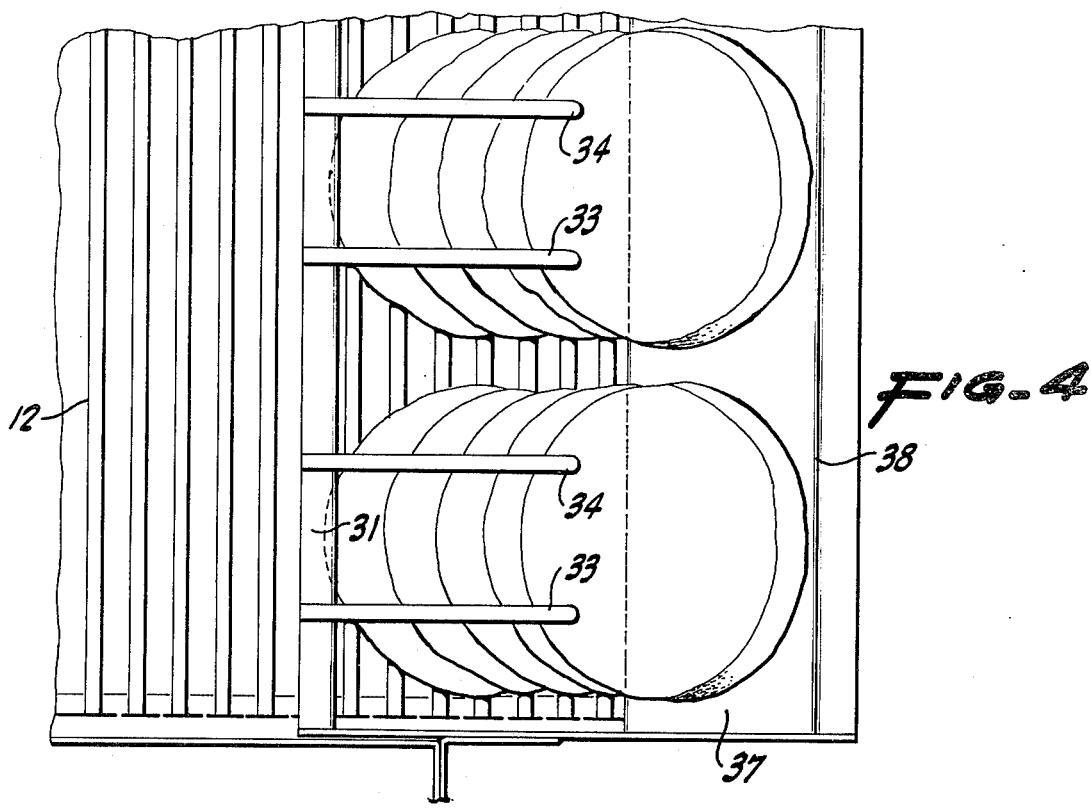
FIG. 4 is a plan of the structure shown in FIG. 3.
Figure 3:
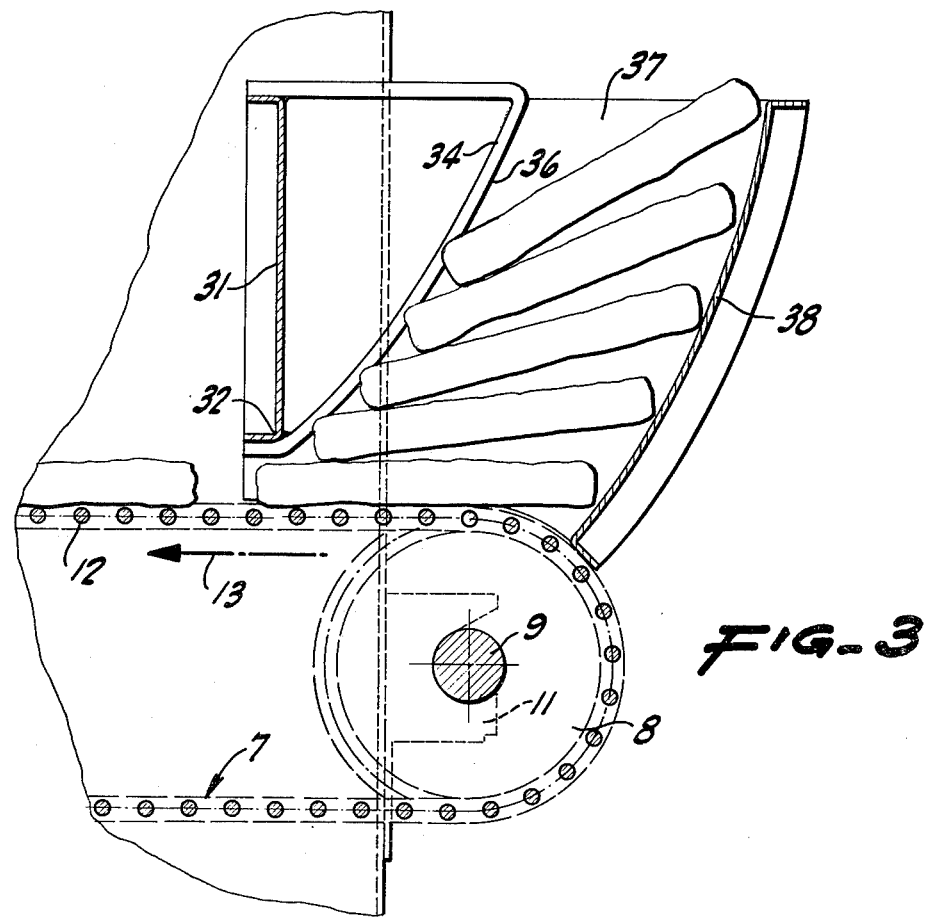
FIG. 3 is a view comparable to FIG. 1 but showing a modified form of frozen patty feeder.

As shown in FIGS. 3 and 4, there is a modification of the arrangement in which it is not possible to stack patties in anything other than a staggered or shingled array.

In the FIGS. 3 and 4 version, the frame and conveyor structure are precisely as before, but the first wall 31, although having its lower edge 32 at about the same position as the wall 21, nevertheless is not relied upon as a barrier per se, but rather is at appropriate intervals provided with pairs of wall rods 33 and 34 suitably supported on the frame and having a generally curved contour 36 defining one margin of a patty feeding channel 37.

Also supported on the frame is a second feeder wall 38 inclined downwardly and forwardly in the direction of the arrow 13 as before. But, rather than being planar, the wall 38 is slightly curved so that the transverse distance between the wall rods 33 and 34 and the exposed face of the wall 38 is approximately a constant and is approximately the same as the diameter of the individual patty. The wall 38 is likewise made of quite slippery material such as polished stainless steel and is inclined at approximately the same angle as the wall 26.

In this arrangement, the frozen patties are broken apart as before and are introduced into the channel 37. When the patties are approximately in position, they are restrained transversely since their curvature interfits with the two rods 33 and 34, affording some longitudinal alignment and inhibiting transverse displacement. The rear edges of the patties rest on the polished wall 38, and the dimensions are such with most patties that the individual patties do not contact each other over a wide horizontal area any more, but rather the forward edge of a patty rests on the upper surface of the subjacent patty and the rear portion of the patty has virtually a point contact with the subjacent wall 38.

The feeding transpires as previously described, with the lowermost patty being within range of the heaters and being warmed, so that it tends to defrost or soften and interengage somewhat with the cross bars of the conveyor. The lowermost patty is then advanced in the direction of the arrow 13, and when its support is withdrawn from the next above patty, that second patty drops by gravity and under the influence of the weight of the patties above it. The forward central portion of the patty slides easily against the rods 33 and 34 and the trailing portion of the patty slides easily on the wall 38. This feed arrangement occurs repeatedly as the conveyor advances. The supervisor can add additional patties from time to time, in each instance placing them spaced somewhat apart and in positions confined or established by the rods 33 and 34 and the wall 38.

We claim:

1. A feeder for frozen meat patties having a predetermined thickness and diameter comprising a broiler conveyor upper run all portions of which are below the plane of the patty engaging portions thereof; means for mounting said upper run for advancement in a predetermined horizontal direction; a first upstanding wall extending transversely of said direction and at its lower margin disposed above said conveyor upper run slightly more than said predetermined thickness; a second wall inclined to the vertical and extending transversely of said direction in advance of said first wall, said second wall at the bottom being substantially in said plane and being spaced from said first wall a horizontal distance substantially equal to said diameter, and said second wall at the top being horizontally spaced from said first wall substantially more than said diameter, whereby one of said patties can rest on said upper run and a plurality of said patties can rest on said one of said patties and on each other in step-wise fashion with the trailing edges of all of said patties resting against said second wall.

2. A device as in claim 1 in which said second wall is slippery to a contacting portion of said frozen patty.

3. A device as in claim 1 in which said second wall is inclined downwardly and in said direction from the top down at about forty-five degrees.

4. A device as in claim 1 in which said first wall and said second wall together define a downwardly converging space open at the top to receive a horizontal patty and open at the bottom to said conveyor run.

5. A device as in claim 4 in which said second wall is arranged to support the bottom trailing edge of said patty from below when the bottom leading edge of said patty is on said upper run of said conveyor.

6. A device as in claim 1 in which said first wall is defined by transversely spaced and transversely aligned upright rods.

* * * * *